United States Patent [19]

Ackermann

[11] Patent Number: 4,467,666
[45] Date of Patent: Aug. 28, 1984

[54] TORQUE SUPPORT
[75] Inventor: Wilhelm Ackermann, Essen, Fed. Rep. of Germany
[73] Assignee: Mannesmann Aktiengesellschaft, Dusseldorf, Fed. Rep. of Germany
[21] Appl. No.: 257,574
[22] Filed: Apr. 27, 1981

Related U.S. Application Data

[63] Continuation of Ser. No. 238,689, Feb. 27, 1981, abandoned.

[30] Foreign Application Priority Data

Mar. 1, 1980 [DE] Fed. Rep. of Germany ....... 3007916

[51] Int. Cl.$^3$ ...................... F16H 57/00; F16H 37/06
[52] U.S. Cl. ...................................... 74/411; 74/410; 74/606 R; 74/665 B; 74/665 D
[58] Field of Search ............ 74/665 N, 665 B, 665 D, 74/665 E, 606 R, 607, 410, 411; 403/23, 50, 51

[56] References Cited

U.S. PATENT DOCUMENTS

| | | | |
|---|---|---|---|
| 2,844,048 | 7/1958 | Bennett et al. | 74/584 |
| 3,151,502 | 10/1964 | Kron et al. | 74/411 |
| 3,167,975 | 2/1965 | Durand | 74/665 B |
| 3,207,002 | 9/1965 | Lakin et al. | 74/411 |
| 3,400,603 | 9/1968 | Stafford | 74/411 |
| 3,400,952 | 9/1968 | Swenson et al. | 403/51 |
| 3,759,116 | 9/1973 | Schroder | 74/665 B |

FOREIGN PATENT DOCUMENTS

| | | |
|---|---|---|
| 887443 | 8/1953 | Fed. Rep. of Germany. |
| 1014811 | 3/1959 | Fed. Rep. of Germany. |
| 1171690 | 6/1964 | Fed. Rep. of Germany. |
| 1650848 | 12/1970 | Fed. Rep. of Germany. |
| 2531027 | 1/1977 | Fed. Rep. of Germany. |
| 1249460 | 10/1971 | United Kingdom. |

Primary Examiner—Allan D. Herrmann
Assistant Examiner—D. Wright
Attorney, Agent, or Firm—Mandeville and Schweitzer

[57] ABSTRACT

A torque support is provided having a casing supported by a pair of symmetrically arranged steering rods which are pivotally mounted to a pair of upwardly slanted guide rods. The guide rods are pivotally supported on a base member. Inter-connecting the guide rods and the steering rods is a tension-compression rod capable of absorbing tensile and compressive forces. All of the elements of the torque support are provided above floor level.

The tension-compression rod is constructed as a plurality of elongated sections, separated from one another by gaps. Located within the elongated sections are compressive spring bundles and a shaft bolt which is secured to supporting surfaces of the elongated sections. In this manner, compressive and tensile forces are capable of being absorbed by the tension-compression rod.

8 Claims, 3 Drawing Figures

TORQUE SUPPORT

RELATED APPLICATIONS

This application is a continuation application of U.S. Ser. No. 238,689, filed Feb. 27, 1981, now abandoned.

BACKGROUND OF THE INVENTION

The present invention relates to a torque support for a driving gear. The driving gear is non-rotatably secured to a shaft pivot and is driven by a plurality of motors secured to the torque support. Thus, rotation of the driving gear will correspondingly rotate the shaft pivot. The present invention is particularly useful in connection with the driving gears useful with metallurgical converters or vessels. Such driving gears provide selective tilting of the metallurgical converters, as required. Generally, a gear box supporting the motors, gear reduction mechanisms, pinion gears and the large sprocket is supported around the centrally located shaft pivot. The driving motors are secured to the gear box and are each provided with reduction gear mechanisms which, in turn, mesh with pinion gears. The pinion gears correspondingly mesh with a large sprocket gear, which is, as previously mentioned, non-rotatably secured to the shaft pivot of the metallurgical furnace.

Pursuant to the present invention, the torque support is provided with a pair of symmetrically arranged steering rods which are pivotally mounted to the torque support. The central axis of the pivotal connections existing between the steering rods and the torque support is parallel to the central axis of the shaft pivot sought to be rotated. The pivotal connection between the steering rods and the torque support may, in the preferred embodiment of the present invention, comprise ball and socket type joints. The lower ends of the steering rods are hinged to lever-like arms which extend parallel to one another. These arms are rotatably secured, again via ball and socket type joints, on a base member which is supported on the floor. In addition, a tension-compression rod, extending parallel to the floor is provided which extends between and interconnects the upper ends of the parallel lever-like arms.

DESCRIPTION OF THE PRIOR ART

Driving gears of this type are frequently also called flying driving gears, since the driving gear box is not supported on a stationary platform but, rather, is supported on the shaft pivot, which, consequently, carries the full weight of the driving gear. Arranging the driving gear on the shaft pivot eliminates the necessity for a mechanical coupling between the shaft pivot and the driving gear. This mechanical coupling has generally been arranged on a separate platform. Additionally, by locating the driving gear directly on the shaft pivot, all movement by the shaft pivot results in an immediate corresponding movement of the driving gear and, vice versa. Such movements can, for example, occur by deflections of the shaft pivot caused by the reaction of the shaft bearings or they may consist of heat expansion of the metallurgical converter on which the shaft pivot is mounted. Additionally, it should be appreciated that a combination of the above described reactions may also cause movement of the shaft pivot. Therefore, it is highly desirable for the shaft pivot and the driving gear to be directly connected without the unnecessary interposition of further mechanical couplings.

Additionally, by locating the driving gear directly on the shaft pivot, thereby eliminating the further mechanical connection between the two elements, manufacturing inaccuracies of the shaft, the shaft bearing, as well as measurement deviations of the base are taken into account, while such inaccuracies, if present with the use of a mechanical coupling between the shaft pivot and the driving gear, would result in frequent and expensive adjustment of the mechanical coupling. It should be appreciated that the larger the furnace converters to be tilted, the larger the necessary bearing clearance which, consequently, contributes to positional deviations of the shaft pivot during its rotation. The driving gear permits all shifts of the shaft pivot without adverse consequences since it is directly located on the shaft pivot. Additionally, location of the driving gear on the centrally located shaft pivot insures that the driving pinion gears of the various motors mesh irrespective of the position of the driving gear.

Torque supports for riding driving gears including the flying driving gear type have generally taken the form of a gear box which is protected from rotation by being supported at a fixed or stationary point. Allowing for the motions of the gear box is made through torque supports fastened directly to the gear box. The other end of the torque supports of this type are, as a rule, positioned and secured to a base. The positioning of the ends of the torque supports may consist of a mechanical-kinematical movable joint. It can also take the form of a lever-like arrangement. In either event, counter-supporting forces are produced according to the two turning directions of the shaft pivot.

Basically, three types of torque supports are known. The first type consists of a co-vibrating lever-shaped torque support fastened directly to the gear box; the end of this type of torque support is positioned at the base by a spatially moving joint.

The second type of torque support is also formed as a lever arrangement, in which the motion of the shaft pivot or of the gear box is transmitted in the form of torsional stress to a shaft vertically arranged with respect to the axis of the shaft pivot.

Finally, the third type of torque support forms a lever arrangement in which the torque is transmitted in the form of tension or compression to a tension-compression rod which is also arranged vertically with respect to the axis of the shaft pivot.

A torque support of the first type described above, is shown in German Pat. No. DE-PS No. 887,443. In that reference, the steering rods are fastened by toggle levers to one end of the lever arms, with the ball and socket joints of the toggle levers located at floor level. The other end of the lever arm, however, protrudes into a base, with the tension-compression rod, connecting the parallel arms of both of the toggle levers, extending within the base. The solution offered by this reference thus requires canals in the base. In addition, the canals must be covered in order to eliminate the danger of accidents to operating and maintenance personnel. Furthermore, it is significantly more complicated to install a torque support of this type, i.e., having apparatus elements in the canals than it is to install a similar apparatus with all elements located at floor level.

It is an object of the present invention to create a simplified design for a torque support with respect to the conventional supports. It is a further object of the present invention to arrange a torque support entirely above floor level thereby facilitating the ease of installation and, if required, dismantling. It is also an object of the present invention to provide a torque support having the working elements of the apparatus fully visible during operation, which object is achieved by locating the entire torque support structure above the floor level.

SUMMARY OF THE INVENTION

According to the present invention, an above floor level torque support is provided by using parallel guide rods having stationary ball and socket joints secured to the base member which is secured to the floor. The guide rods are arranged slantingly upwardly with respect to the base member and floor. A tension-compression rod, extending between the ends of the parallel guide rods not secured to the base member, is positioned above floor level at a height between the base of the torque support and the upper ends of the parallel steering rods. The present invention utilizes a tension-compression rod. It does not, however, contemplate that the rod be arranged vertically with respect to the shaft pivot axis but, rather, it is contemplated that the tension-compression rod be arranged substantially parallel to the base upon which the entire structure is supported. Thus, the tension-compression rod is intended to extend substantially perpendicular to the central axis of the shaft pivot. The tension-compression rod extends between ball and socket joints serving to connect the upwardly slanting parallel guide rods and the parallel steering rods. The tension-compression rod is supported beneath the case of the gear box. The parallel guide rods, having structural integrity, according to the present invention, are attached to the base member by fishplates. In this manner, the characteristics of the upwardly slanting parallel guide rods eliminates, on one hand, the conventional toggle lever arms, thereby simplifying the construction of the torque support and, on the other hand, still provides an effective lever arm. In addition, the present invention has all of the working elements of the torque support located above floor level. Therefore, installation, removal and periodic maintenance are easily performed. Floor vehicles can now be used without the necessity for special adjustments for the installation or dismantling operation of the torque support.

Also, by locating the torque support completely above floor level, the mechanical operation of the mechanism can be easily observed during operation.

In order to take into account the unpredictable spatial motions of the shaft pivot, the present invention contemplates that the joints or connections of the gear box; the tension-compression rod; the upper portions of the parallel guide rods and the stationary or lower ends of the parallel guide rods be provided with spherical ball and socket joints.

According to a further development of the present invention, it is intended that the tension-compression rod be sectioned into at least two elongated sections. Each such section is arranged with a hollow, containing damping elements, which are inserted or installed between the adjacent sections. The damping elements are specifically designed for the characteristic operational momentum of the body held by a pair of shaft pivots, the body being, in the preferred embodiment, a metallurgical vessel which is intended to be tilted. For example, in the case of a heavy vessel, a steel works converter vessel, (often having a useful load of 400 tons or more) repair drive moments or catastrophe drive moments are believed to be two and a half times that of a normal drive moment. Accordingly, the damping elements must be relatively stiff or hard. The gap located between the two longitudinal sections, in those instances where the tension-compression rod is sectioned, serves to absorb the deflection of the damping elements.

According to yet another aspect of the present invention, a shielded arrangement for the damping element is achieved by locating the damping element in the hollow space of one of the longitudinal sections of the tension-compression rod. The damping elements, located in the hollow spaces of the tension-compression rod, must, of special necessity, be compact damping elements. This is achieved by providing compression spring bundles as the damping elements. Alternatively, pre-tightened compression spring bundles can be used as the damping elements.

The absorption of tension or compression forces in the separated elongated sections of the tension-compression rod by the damping elements is facilitated by having the elongated sections connected by a shaft bolt. The shaft bolt is axially fixed at one of the elongated sections and lies parallel to the direction of expansion, and the direction of compression, against the adjacent elongated section. In addition, the shaft bolt abuts against internally located support surfaces of the elongated section of the tension-compression rod.

By securing a damping element to a shaft bolt which, in each instance, connects the two elongated sections of the tension-compression rod, a compression spring bundle rests against a ledge of the shaft bolt. The ledge is arranged between supporting surfaces of the elongated section of the tension-compression rod. A screw element with an associated nut for the pre-tightening of the compression spring bundle is also provided, which screw passes through a pressure plate and a supporting surface.

Additionally, the damping elements can be shielded from dirt and dust by merely closing the gap between the two elongated sections of the tension-compression rod. This can be easily accomplished by utilizing a resilient ring-shaped bellows.

An exemplary embodiment of the present invention is shown in the drawings and is described herein, wherein:

DETAILED DESCRIPTION OF THE PREFERRED EMBODIMENT

Figure 1:
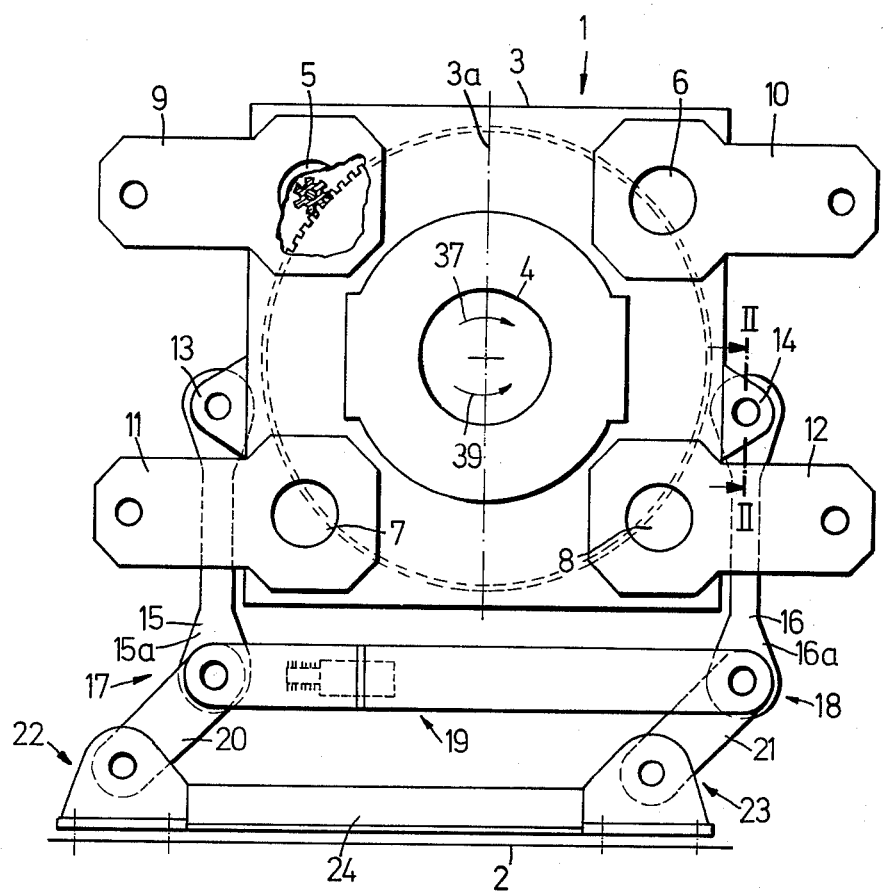
FIG. 1 is a front elevational view of the torque support apparatus, according to the invention, shown in the direction of the shaft pivot.

As best seen in the drawings, the torque support 1 is an apparatus supporting the active drive forces of a shaft pivot against the base 2. According to the present invention, the base 2 reacts with a steady and unvarying force. A gear box 3 supports the shaft pivot 4. A steel manufacturing furnace or converter tilt drive mechanism serves as an example of the present invention. It will be appreciated, however, that the present invention, i.e., a torque support apparatus can be used in other environments in association with other mechanisms. For the purposes of this example, the large sprocket gear of the shaft pivot, residing within the gear box 3 is not shown on the drawings. The sprocket is, however, non-rotatably connected to the shaft pivot 4, whereas the gear box 3 is supported by means of rotating bearings on shaft sections of the shaft pivot 4. Pinion gears mesh with the large sprocket and motors 5, 6, 7 and 8 are connected to and drive the pinion gears through gear reduction mechanisms 9, 10, 11 and 12. One pinion gear and one of the motors 5, 6, 7 and 8 relate to each reduction mechanism 9, 10, 11 and 12.

The torque support 1, according to the present invention, is supported by ball and socket joints 13 and 14, which are mounted on flanges of the gear box 3. Extending from the ball and socket joints 13 and 14 are steering rods 15 and 16. Steering rods 15 and 16 extend parallel in a downwardly directed manner. The lower ends of the steering rods 15 and 16 are indirectly connected with each other through ball and socket joints 17 and 18, which support tension-compression rod 19 therebetween. The ball and socket joints 17 and 18 are located at the lower ends 15a and 16a of the steering rods 15 and 16. Also connected to the lower ends 15a and 16a of the steering rods 15 and 16 are parallel guide supports 20 and 21, which are, in their normal position, located at an angle of 45° with respect to the floor upon which the entire support rests. This angle, however, may be selected within a range of approximately +80° to −80° to the horizontal, thereby always creating an effective power or lever arm. The lower ends of parallel guides 20 and 21 are each separately positioned in stationary ball and socket joints 22 and 23. The stationary ball and socket joints 22 and 23 are also indirectly connected to one another through frame element 24. Parallel guide rods 20 and 21 are secured to flanges or fish-plates of the frame element 24.

Figure 2:
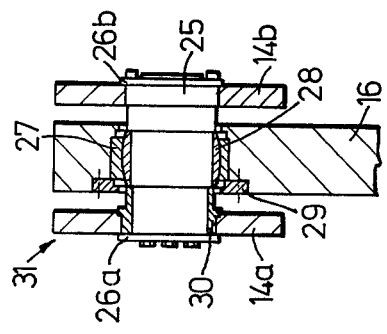
FIG. 2 is a sectional view taken along lines 2—2 of FIG. 1, showing a spherical ball and socket joint, enlarged with respect to FIG. 1.

The ball and socket joints 13 and 14 of the gear box 3; the ball and socket joints 17 and 18 connecting the steering rods 15 and 16 (a) to one another through the tension-compression rod 19 and (b) to parallel guide rods 20 and 21; as well as the stationary ball and socket joints 22 and 23 serving to support the parallel guides upon the frame 24; all correspond to the construction shown in FIG. 2. As best seen in FIG. 2, bearing side walls or flanges 14a and 14b are rigidly arranged at both sides of steering rod 16. The bearing side walls 14a and 14b along with the journal pin 25, flange caps 26a and 26b, spherical bearing support 27, spherical bushing 28, bearing cap 29 and a bearing spacer sleeve 30 form a spherical ball and socket joint 31 which, as just mentioned, is the ball and socket joint basic configuration for all of the ball and socket joints of the present invention. This type of ball and socket joint is preferred; however, it should be appreciated that other specific forms of ball and socket joints can be utilized without departing from the spirit of the present invention.

Figure 3:
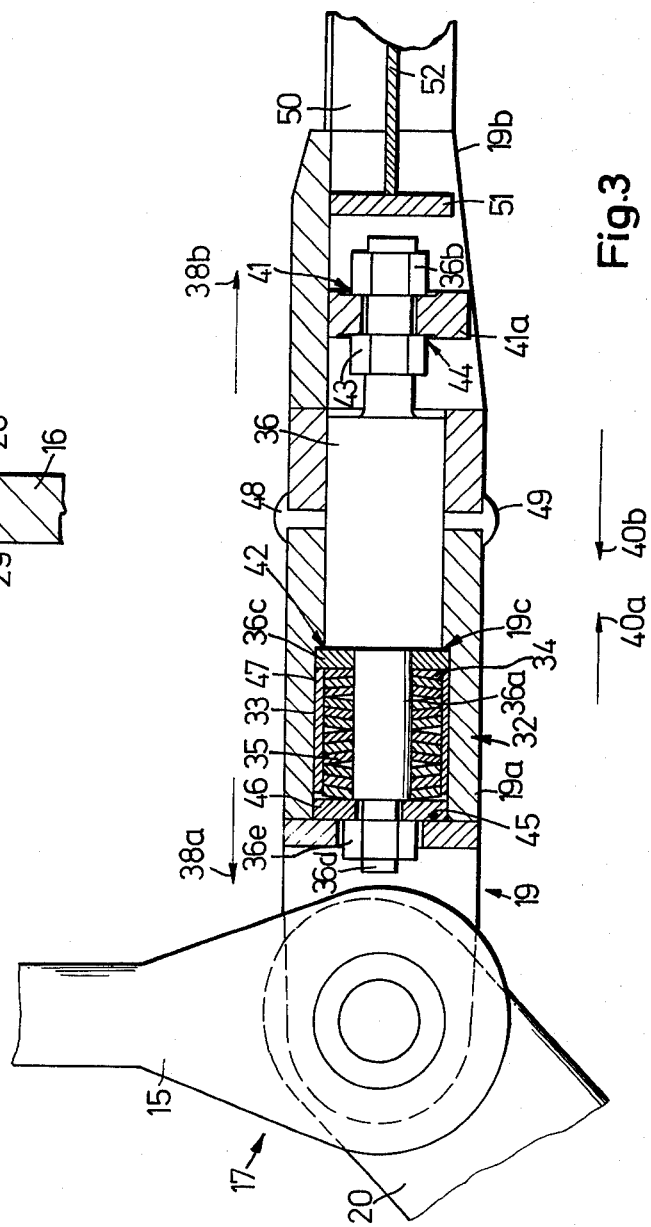
FIG. 3 is an axial cross section of the tension-compression rod with a damping element, also enlarged comparatively with respect to FIG. 1.

As best seen in FIG. 3, the tension-compression rod 19 extending between and indirectly connecting together the lower ends of steering rods 15 and 16 and the upper ends of guide rods 20 and 21, is sectioned into elongated sections 19a and 19b. Each elongated section serves to provide support to one another through the intermediary of a damping element 32, which is held within and between the elongated sections. Elongated section 19a is provided with a hollow space or cavity 33. In the illustrated embodiment, the damping elements are formed by cup-shaped springs 34, which are gathered together into a single compression spring bundle 35. It should also be here appreciated that other forms of damping elements can be utilized without departing from the spirit of the present invention. In the preferred embodiment of the present invention, however, the illustrated damping elements are utilized in connection with a shaft bolt 36 and shaft 36a. Shaft bolt 36 has its longitudinal axis parallel to the longitudinal axis of the tension-compression rod 19. Shaft 36a serves to align the compression spring bundle 35 by passing through the individual cup springs 34. Shaft bolt 36 along with shaft 36a interconnect the elongated sections 19a and 19b of the tension-compression rod 19.

Tensile forces 38a and 38b are created by rotation of shaft pivot 4 in turning direction 37 (see FIG. 1) while compressive forces 40a and 40b are created during turning in turning direction 39. These tensile and compressive forces act upon tension-compression rod 19 and are absorbed, at least partially, by the damping elements 32.

For example, during the occurrence of tensile forces 38a and 38b, the screw nut connection 36b rests firmly against a support surface 41 of a rib 41a, which, together with the elongated section 19b of the tension-compression rod 19, represents a rigid connection. A cylindrical ledge 36c of shaft bolt 36 rests against a recess surface 19c, which forms a supporting surface 42.

During the occurrence of compressive forces 40a and 40b, the screw nut connection 36b of the shaft bolt 36, together with the lock nut 43 lying pressed against the supporting surface 44 provide structural integrity. The elongated section 19a with its corresponding support surface 45, is pressed because of the cup springs 34 against ledge 36c of shaft bolt 36. The contact occurs through the compression spring bundle 35. A pressure plate 46 and a support surface 45 accept screw bolt element 36d which is secured by nut 36e. Tightening of the nut 36e pre-tightens the cup springs 34 and the initial stressing force may preferably be limited via the length of the spacer casing 47.

The gap 48 occurring between the two elongated sections 19a and 19b of the tension-compression rod 19 may be protected against the intrusion of dust or dirt by means of a resilient ring bellows 49.

The tension-compression rod 19 may be manufactured as a single pipe shaped unit for accommodating the tensile and compressive forces. As illustrated, the tension-compression rod 19 consists of pipe shaped elements manufactured with structural steel 50 welded to the pipe elements which are secured by serrated ribs 51 and 52.

It will be appreciated that other embodiments of the present invention can be constructed without departing from the teaching of the present invention, the invention being defined by the scope of the appended claims and equivalents thereof.

I claim:

1. A torque support apparatus positioned above floor level comprising:
   (a) a shaft pivot;
   (b) a driving sprocket gear non-rotatably mounted on said shaft pivot;
   (c) a gear box supported on said shaft pivot;
   (d) at least one drive motor secured to said gear box;
   (e) each of said drive motors being provided with reduction gearing and a pinion gear;
   (f) each of said pinion gears meshing with said sprocket gear;
   (g) parallel steering rods rotatively attached on opposide sides of said gear box by ball and socket-type joints, said steering rods being equally spaced from said gear box and having upper and lower ends;
(h) parallel and equal in length guide rods, each having upper and lower ends, the upper ends of said guide rods being attached, by ball and socket-type joints, to the lower ends of steering rods, the lower ends of said guide rods being stationarily arranged, by ball and socket joints;
(i) at least one tension-compression rod inter-connecting said parallel guide rods, said rods having at least one internally-positioned spring element and having at least two longitudinal sections separated from one another by a gap;
(j) said parallel guide rods, extending in their normal position, slantingly upwardly from said floor level at an angle to said rods; and
(k) said tension-compression rods extending between said ball and socket-type joints of said lower ends of said steering rods and between the upper ends of said guide rods.

2. A torque support apparatus as claimed in claim 1, further comprising
(a) a base member supported on a floor; and
(b) said lower ends of said guide rods are connected to said base member by fishplates.

3. A torque support apparatus as claimed in claim 1, wherein
(a) said tension-compression rod extends parallel to the floor upon which said apparatus is supported;
(b) said tension-compression rod having at least two elongated sections;
(c) a gap is located between each of said sections; and
(d) each of said sections being provided with damping elements.

4. A torque support apparatus as claimed in claim 1, wherein
(a) said tension-compression rod is provided with at least one hollow space; and
(b) a damping element is contained in at least one of said hollow spaces.

5. A torque support as claimed in claim 3, wherein
(a) said damping elements are provided with compression spring bundles; and
(b) said spring bundles are pre-tightened.

6. A torque support as claimed in claim 3, wherein
(a) said elongated sections are connected by a shaft bolt;
(b) said shaft bolt is axially positioned in said tension-compression rod;
(c) said shaft bolt, during tension resting against an adjacent elongated section of said tension-compression rod; and
(d) said shaft bolt, during compression, resting against supporting surfaces of said tension-compression rod.

7. A torque support as claimed in claim 6, wherein
(a) at least one of said elongated sections is provided with at least one damper element;
(b) each of said damper elements having a compression spring bundle;
(c) each of said compression spring bundles resting against a ledge of said shaft bolt;
(d) a screw element and nut passes through a pressure plate;
(e) said pressure plate being supported by a support surface of said elongated section; and
(f) said nut being tightened on said screw element for pre-tightening said compression spring bundles.

8. A torque support as claimed in claim 3, wherein
(a) said gap is closed by a resilient ring type bellows.

* * * * *